April 26, 1966 R. G. ALDABO 3,247,818
BLIND STITCH SEWING MACHINE
Filed Dec. 4, 1964 7 Sheets-Sheet 3
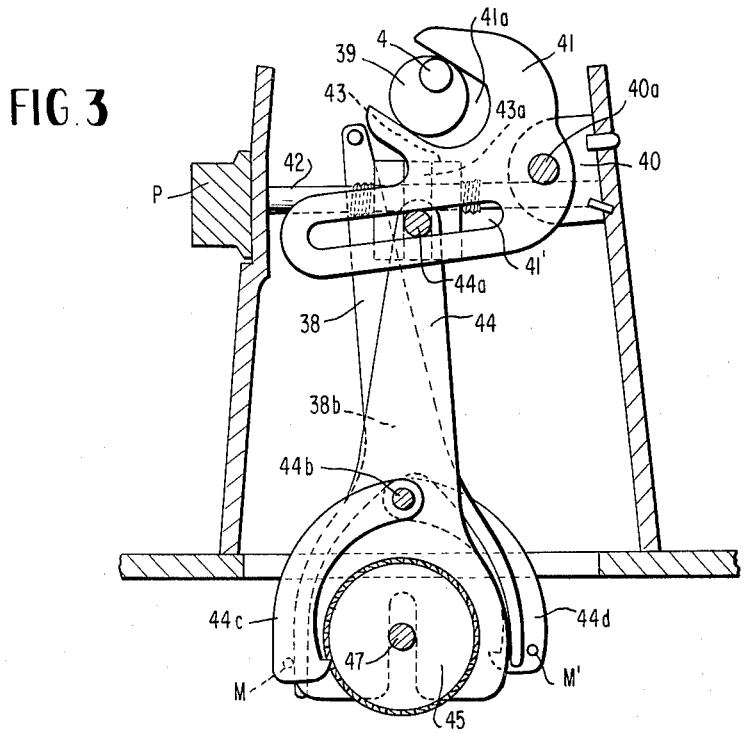
FIG.3
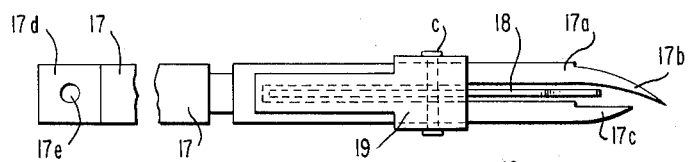
FIG.5a
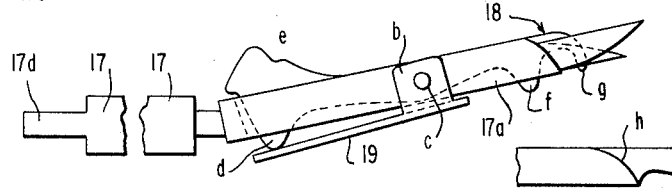
FIG.5b
FIG.5d
FIG.5e
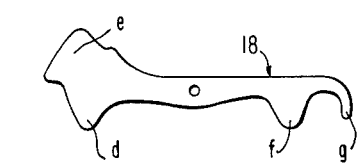
FIG.5c
INVENTOR
RAMON GABARRO ALDABO
BY Sughrue, Rothwell, Mion, Zinn & Macpeak
ATTORNEYS April 26, 1966  R. G. ALDABO  3,247,818
BLIND STITCH SEWING MACHINE
Filed Dec. 4, 1964  7 Sheets-Sheet 4
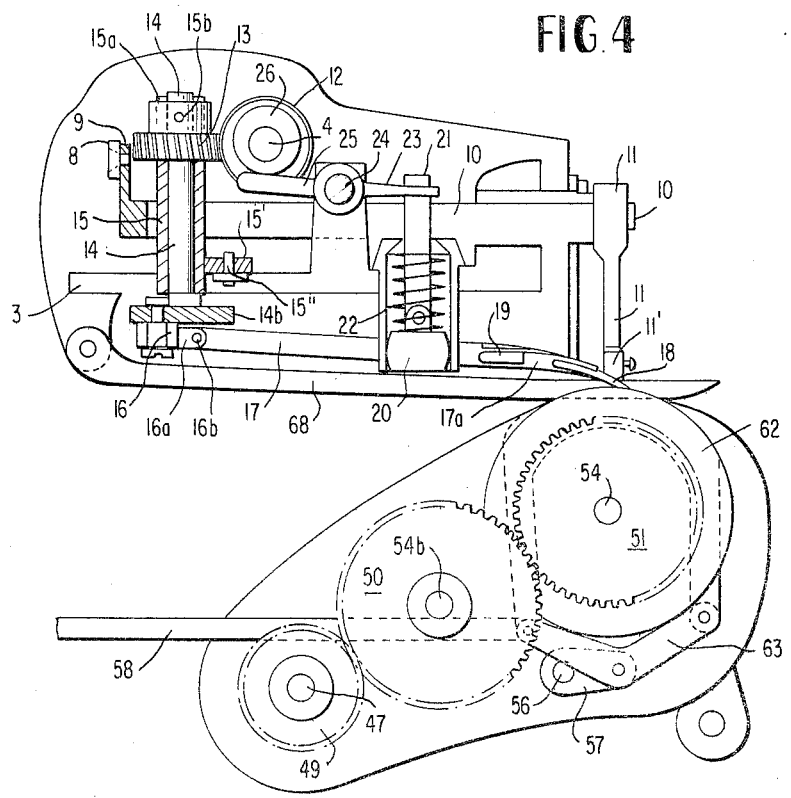
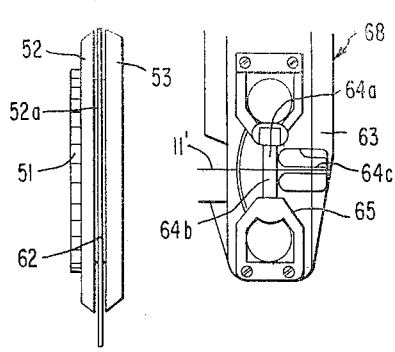
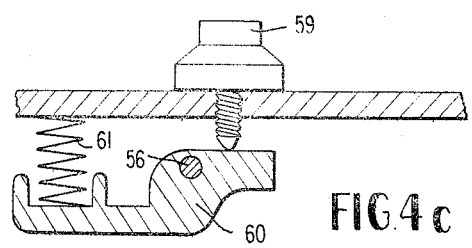
INVENTOR
RAMON GABARRO ALDABO
BY Hughes, Rothwell, Mion, Zinn & Macpeak
ATTORNEYS April 26, 1966 R. G. ALDABO 3,247,818
BLIND STITCH SEWING MACHINE
Filed Dec. 4, 1964 7 Sheets-Sheet 5

INVENTOR.
RAMON GABARRO ALDABO
BY
Sughrue, Rothwell, Mion, Zinn & Macpeak
ATTORNEYS April 26, 1966 R. G. ALDABO 3,247,818
BLIND STITCH SEWING MACHINE
Filed Dec. 4, 1964 7 Sheets-Sheet 7

INVENTOR
RAMON GABARRO ALDABO

BY
ATTORNEYS

United States Patent Office 3,247,818
Patented Apr. 26, 1966

3,247,818
BLIND STITCH SEWING MACHINE
Ramon Gabarro Aldabo, Lerida, Spain, assignor to
J. Strobel & Sohne, Munich, Germany, a firm of
Germany
Filed Dec. 4, 1964, Ser. No. 418,376
Claims priority, application Spain, July 24, 1961,
269,349
3 Claims. (Cl. 112—176)

This application is a continuation-in-part of copending application Serial Number 211,320, filed July 20, 1962, now abandoned.

This invention relates to a blind stitch sewing machine, and more particularly to such a sewing machine having an improved looper mechanism.

Many blind stitch sewing machines are known in the prior art, and quite a number are of the type employing an oscillating curved needle carrying a single thread and a looper which cooperates with the goods and needle movement to form a single thread chain stitch. Two such blind stitch sewing machines are shown in Parry Patent 2,601,054 and Buono Patent 2,894,470. While such blind stitch sewing machines are entirely satisfactory for forward sewing, that is, with the goods moving away from the operator, the looper of such machines has in the past operated in such a manner that the machine would not properly form a chain stitch during backward sewing, when the goods move toward the operator. A stitch could not be formed because the thread would slip from the looper or be pulled from the looper by movement of the goods.

The blind stitch sewing machine which is the subject of this invention avoids the failing of the prior art machines by providing an improved looper which permits forming a single thread chain stitch regardless of whether the sewing operation is performed during forward or backward movement of the goods.

It is an object of this invention to perform blind stitch sewing during both backward and forward sewing.

A further object of this invention is to provide an improved looper mechanism in a blind stitch sewing machine to perform both backward and forward blind stitch sewing.

A still further object of this invention is to provide an improved looper mechanism for use with a blind stitch sewing machine which may controllably retain and release a thread loop during a blind stitch sewing operation with backward motion of the goods.

Other objects of the invention will be pointed out in the following description and claims and illustrated in the accompanying drawings, which disclose, by way of example, the principle of the invention and the best mode which has been contemplated of applying that principle.

In the drawings:

FIGURE 3 is a sectional view showing a detail of the means for feeding the cloth, taken along line III—III of FIGURE 2;

FIGURE 4 shows the means for feeding the cloth as well as the means for changing the position of the looper from the position for the forward movement to the position for the backward movement, in a section along lines 4—4 of FIGURE 1;

FIGURES 4a and 4b show two details of the feeding means, and FIGURE 4c shows a portion of the means for regulating the stitch depth;

FIGURES 5a and 5b are a side view and top plan view, respectively, of the looper;

FIGURE 5c is a side view of the rocking plate of the looper;

FIGURES 5d and 5e show a detail of the front ends of the looper (from above and from below, respectively);

Figure 1:
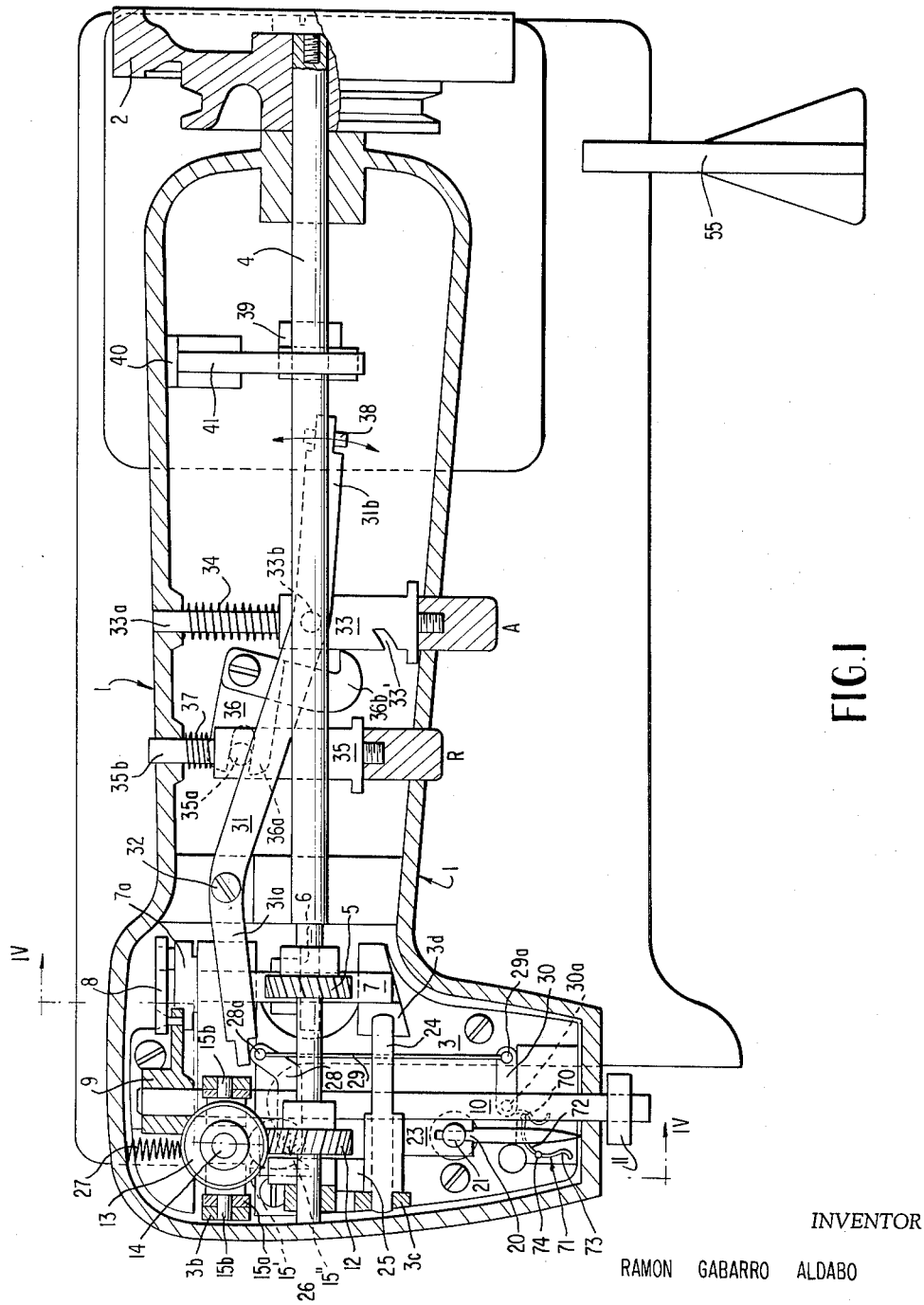
FIGURE 1 is a top plan view of a sewing machine of this invention, in which the upper part of the cover has been removed and certain parts are shown in section for the sake of clarity.

The machine, as shown in the drawings, comprises a head 1 having in its interior a transversely disposed main shaft 4 with a wheel 2 fastened at one end, which may be driven by any suitable power source (not shown).

A gear 5, an operating gear 12 and an eccentric 39 are fastened to the main shaft 4 and driven thereby. A main block 3, as shown in FIGURE 1, is attached by screws to the bottom of the head 1. Below the main shaft 4, and at right angles thereto, are mounted shafts 7 and 10. A gear 6, meshing with gear 5, is fastened to shaft 7, and an eccentric 7a is attached to the back end of shaft 7. A lever 9 is fastened to the back end of shaft 10 and, at its free end, the lever 9 is pivotally attached to one end of a linkage 8, the other end of linkage 8 being pivotally attached in turn to an eccentrically disposed pivot pin provided in eccentric 7a. A needle holder 11 is fastened to the front end of shaft 10, this holder being provided with a grip 11' for holding needle 11". Rotation of the main shaft 4 causes, by the engagement of gears 5 and 6, the rotation of shaft 7. This rotation is transformed, by the eccentric 7a and the linkage 8 connected to the lever 9, into an oscillating movement of the shaft 10, which provides the required oscillatory movement of the curved needle 11".

Figure 12:
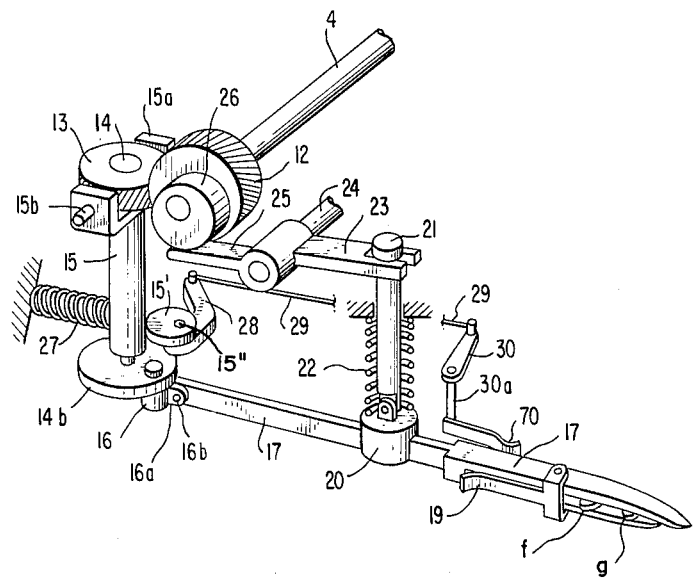
FIGURE 12 is an exploded perspective view of the mechanism controlling the looper movement.

As shown in FIGURES 1, 4 and 12, a vertical shaft 14 is fastened at its upper end, to a gear 13 engaging gear 12, and, at its lower end, to an eccentric 14b. A sleeve 15 is placed around shaft 14, and has upper flanges 15a extending upwardly and outwardly around gear 13 from opposite sides thereof, see FIG. 12. A pair of oscillation pins 15b connect upper flanges 15a to extensions 3b emerging upwardly from the main block 3. A cam 15' is fastened to a vertical short shaft 15" rotatably received in a hole (not shown) provided in main block, and this cam abuts against sleeve 15. A spring 27 is provided to push the sleeve 15 against the cam 15'. Cam 15' is thus adapted, on rotation of shaft 15", to move the sleeve 15 with shaft 14 a short distance of about 1 mm. by rocking them about oscillation pins 15b.

A bearing 16 eccentrically disposed on the lower surface of eccentric 14b is provided with ears 16a. The rotation of main shaft 4, through the engagement of gears 12 and 13, causes the shaft 14 to rotate around a vertical axis. This rotary motion is converted by the eccentric 14b into an oscillating motion of the bearing 16 and the looper 17. The cam 15' which permits slightly displacing the vertical axis of shaft 14, and thus varying the range over which the movement of the looper 17 occurs, although not affecting the particular distance of the movement, is important in obtaining satisfactory blind stitch sewing in both forward and backward sewing motions, as will subsequently be shown.

The machine is provided with a looper arm 17, which is shown in detail in FIGURES 5a to 5e. The looper arm 17 has a body in the form of a bar and has a looper head 17a with two stationary spreader jaws or ends, an upper jaw 17b and a lower jaw 17c. The looper arm 17 is provided with a pierced back end 17d which is hinged by means of pin 17e to ears 16a of bearing 16. A flat spring 19 is fixed to the looper by means of a pin c passing through lateral extensions b of said spring 19. A rocking plate 18, placed between jaws 17b and 17c, is pierced by said pin c and is adapted to rock about said pin c. The rocking plate 18, shown in detail in FIGURES 5b and 5c, has a control cam e projecting at one side of the looper head 17a and an oppositely extending heel d projecting at the opposite side of the looper. The plate has also a further control cam f and a looper hook g, on the same side as the heel d. In the normal position of the rocking plate 18, cam e and projections f and g project from the looper head. Spreader jaws of the looper 17 are unequal in length, arched, and slightly crossed. They are provided on their upper surface with steps h, h', the lower jaw 17c having on its lower surface a diagonal groove i for guiding the thread.

A shaft 24 mounted on projections 3c and 3d emerging from the main block 3 has fastened thereto levers 23 and 25. A cam 26 attached to main shaft 4 engages lever 25, see FIGS. 1 and 4. A rod 21 is articulately connected to lever 23 at its upper end and is hinged, at its lower end, to a sleeve 20, through which the body of the looper 17 passes. The sleeve 20 acts as a guiding sleeve for looper 17. A spring 22 exerts a downward force on lever 23 and, therefore, keeps lever 25 against cam 26. Rotation of the main shaft 4, by rotating the cam 26, causes an oscillation of the lever 25 around the pivot point provided by the shaft 24. This oscillation of the lever 25 is applied to the rod 21, causing a vertical movement of that rod which carries with it the sleeve 20. Inasmuch as the looper 17 is reciprocated by a drive from the main shaft 4 through the vertical shaft 14 and eccentric 14b, and vertically oscillated by a drive from the main shaft 4 through the cam 26, lever 25, and rod 21, it may be seen that the looper head describes an ellipitical path which is curved in space so that the forward and backward ends of the ellipse are raised. This elliptical path, being derived from the motion of the main shaft 4 which always is driven in the same direction, will always cause the looper head to move in a clockwise direction, viewed from above, regardless of the direction of feed of the goods.

An angular lever 28 is fixed to one end to vertical shaft 15" and at the other end is hinged to the back end of a stay 29, the forward end thereof being hinged in turn to a lever 30, having a shaft 30a, to which a rigid piece 70 is solidly connected. The rigid piece 70 engages a lever 71 so as to cause the end 73 of the lever to be displaced when the levers 28, 30 are operated. The lever 71 is mounted for pivotal movement about a transverse shaft 74, and a coil spring 75 is carried on the shaft to engage the lever and bias it toward the undisplaced position shown in FIGURES 6a-c.

A direction controlling lever 31, FIG. 1, moves about a shaft 32 and has a short arm 31a abutting the back end of angular lever 28 and a long arm 31b engaging the upper end of a vertical lever 38. A shank 33 having a side recess 33' is slidably mounted on a rod 33a and is biased outward by a spring 34. A forward sewing button A mounted on the shank 33 emerges from the front wall through a window and allows compression of the shank against the action of spring 34. An upper projection 33b of shank 33 is received in a hole provided in the central portion of longer arm 31b of the lever 31. A shank 35 parallel to shank 33 is slidably mounted on rod 35b and is provided with an upper projection 35a, a backward sewing button R emerging from the front wall through a window and a spring 37. Between shanks 33 and 35 is placed an angular bell crank 36 which has a fork 36a engaging projection 35a of shank 35 and a pawl end 36b adapted to engage recess 33' of shank 33.

Figure 2:
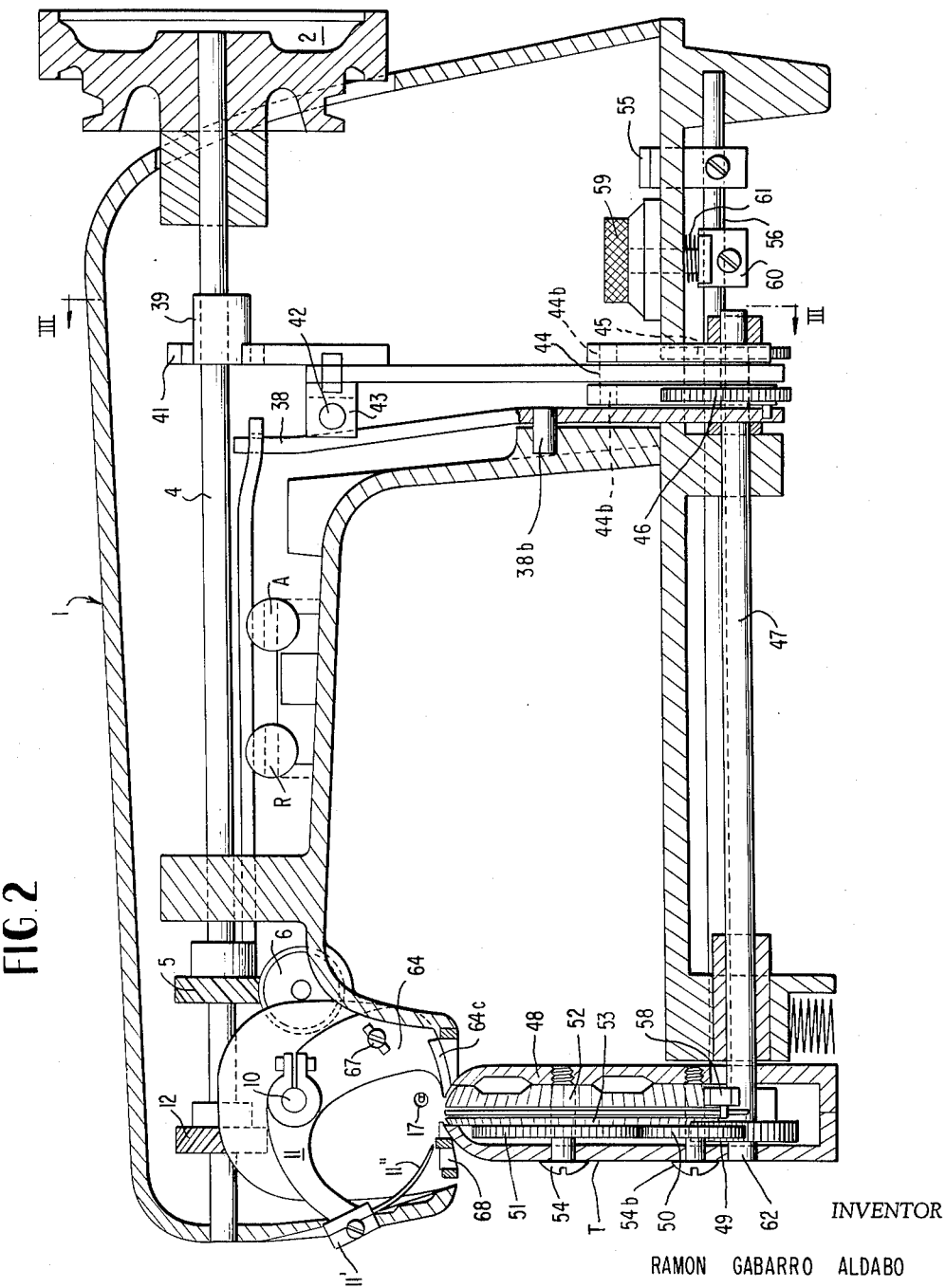
FIGURE 2 is a front elevation view of the machine with the casing and certain other parts shown in section and other parts not shown for the sake of clarity.

Vertical lever 38 has its lower end in the form of a fork and in its central portion a pivot 38b received in a recess provided in the machine head, see FIGS. 2 and 3. A follower 41 is hinged at 40a to a support 40 fastened to the head wall, and is provided with an elongated slot 41' and a mouth 41a, within which eccentric 39 is placed.

Mechanism is provided for regulating the length of individual stitches and feeding the goods for the sewing operation. This mechanism includes a transverse shaft 42 and a sliding block 43 on a threaded portion of the shaft, see FIGS. 2 and 3. The sliding block 43 has a vertical groove 43a. A lever is provided having a body 44 with two upper studs 44a, one sliding in elongated window 41' and the other sliding in the vertical groove 43a. The lever body 44 also has two lower studs 44b fastened to pawl arms 44c and 44d provided in turn with stops M and M'. A transmission shaft 47 has two ratchet wheels 45 and 46 with oppositely inclined teeth which may be engaged by the pawl arms 44c and 44d respectively. The cloth feeding means is housed within a housing T, FIG. 2, which consists of two longitudinal halves 48 joined by screws 54 and 54b which also act as shafts. A transmission pinion 49 is fastened to one end of the transmission shaft 47, and engages a second transmission idler gear 50, see FIG. 4c. Gear 50, in turn, drives a pinion 51 and the toothed cloth engaging discs 52 and 53. The housing formed by the longitudinal halves 48 may rotate about transverse shaft 47 to accommodate varying thicknesses of cloth captured between the toothed discs 52 and 53 and plate 68, or may be manually moved when it is desired to position new work for sewing.

Means are also provided for regulating the stitch depth with reference to the face of the cloth sewn which has no exposed stitch. These means comprise: a shaft 56 supported by its two ends; a rocking piece 60 fixed to said shaft 56 near one of its ends (FIGURES 2 and 4c); a spring 61 pressing against one end of said rocking piece; a threaded adjustment screw 59 acting against the other end of rocking piece 60; a lever 57 fastened to the other end of shaft 56; an angular lever 63 pivoted at its vertex to said lever 57; a lifting bridge 62 placed between toothed discs 52 and 53, to thereby prevent it from going out of its substantially vertical position. Since the means for regulating the stitch depth are independent from the feeding means (moved by shaft 47), a difference in thickness of the material worked on does not alter the distance from the top of the bridge 62 to the path of the needle 11", since the portion of the cloth being stitched emerges through windows 64a and 64b (FIGURE 4b) and what varies is in fact the distance from the inner part of the stitch to the face of the cloth having the exposed stitch but not the distance between the inner part of the stitch and the other surface, as the distance between the plate 68 and the upper portion of the toothed discs 52 and 53 varies according to the thickness of the cloth. In other words, while a thicker cloth may push slightly down the feeding wheels or toothed discs 52, 53, the position of the bridge 62 remains constant and a thicker cloth just emerges a little more through windows 64a and 64b. While the thicker cloth may cause the housing formed by the longitudinal halves 48 to pivot about the shaft 47, and thus move the feeding wheels downward, the independently controlled bridge 62 is not moved. This interplay between the means for regulating the stitch depth and the feeding means is equal to the distance between the lower vertex of angular lever 63 and the bottom of the housing 48. When a downward pressure is exerted on lever 55, fixed to shaft 56, shaft 56, together with levers 57 and 63 are moved down within housing 48 until touching the bottom thereof, and a continued downward pressure will make the housing 48 and the parts contained therein oscillate about shaft 47, thus allowing the withdrawal or the introduction of a new cloth.

Control over forward and backward sewing operation is provided by the two buttons, R and A, which function to control both the cloth feeding mechanism and the operation of the looper rocking plate 18. As may be seen in FIGURE 1, selection of either button R or button A to be depressed will control the position of lever 31. Movement of the lever 31 will move vertical lever 38 to control the engagement of the pawl arms 44c and 44d with the feeding direction control ratchets 45 and 46, thereby controlling movement of the goods away from or toward the operator of the machine. Further, movement of the lever 31 about its pivot 32 will cause the end 31a of the lever to engage the end 28a of angular lever 28. This lever 28 is fixed to and pivots the shaft 15" which carries the cam 15', controlling the slight displacement of the looper path. Further, the lever 28 is connected by stay 29 to a lever 30. This lever is fixed to a vertical shaft 30a and pivots about that shaft. Near the lower end of the shaft 30a is a rigid piece 70 which may be positioned in the path of looper motion or out of the path of looper motion. An angular lever 71 is engaged by the rigid piece 70 when the rigid piece is positioned to be in the looper path, so as to cause the end 73 of the angular lever 71 to also project into the looper path.

Figure 6A:
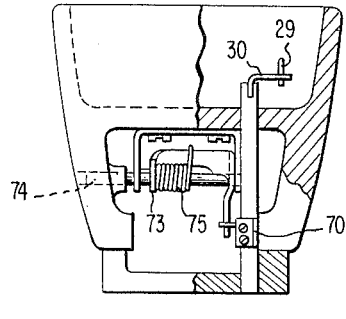
FIGURES 6a, 6b and 6c are an end view, a top view and a side view, all in partial section, showing a number of the elements controlling the looper operation as positioned for forward sewing.
Figure 7A:
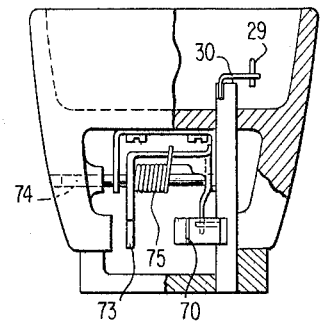
FIGURES 7a, 7b and 7c are similar views illustrating the looper control elements positioned for backward sewing.
Figure 6B:
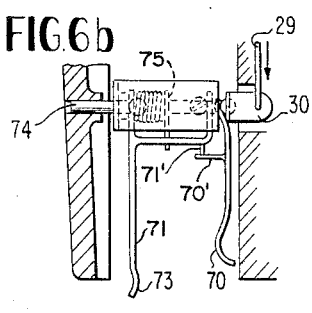
Figure 7B:
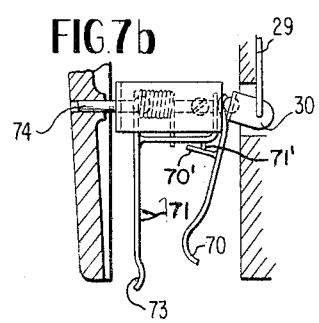
Figure 6C:
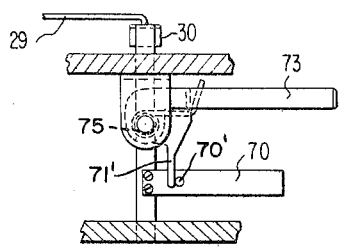
Figure 7C:
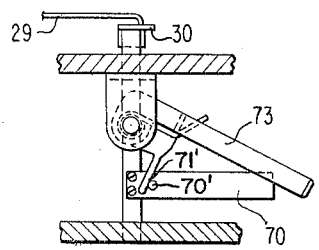

The positions of the rigid piece 70 and the end 73 of the angular lever 71 are made clear by FIGURES 6a through c and 7a through c. FIGURES 6a through c show the rigid piece and angular lever in the positions which they take during forward sewing motion, while the button A is depressed. FIGURES 7a through c show the rigid piece 70 and the end 73 of angular lever 71 in the positions they take during backward sewing motion, while the button R is depressed. As the lever 31 is held in the selected position while a button is depressed, the looper control elements 70 and 73 are similarly held in position during sewing operations.

As shown in FIGS. 6a through c and 7a through c operation of stay 29 pivots lever 30 and rigid piece 70. An extension 70' on rigid piece 70 engages an extension pin 71' on lever 71 so that pivotal inward movement of piece 70 as shown in FIG. 7b causes a pivoted downward movement of lever 71 against the bias of spring 75 as shown in FIG. 7c. When stay 29 pivots lever 30 and piece 70 back to the FIG. 6b position spring 75 returns lever 71 back to the FIG. 6c position.

Figure 8:
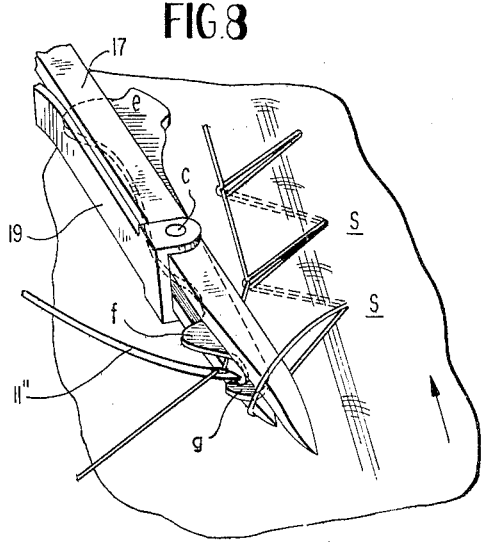
FIGURE 8 is a perspective view of the looper of the present invention during forward sewing motion, showing the threaded needle entering the loop and the single thread chain stitch formed by the machine.

The cooperation of the rigid piece 70 and the end 73 of the angular lever 71 with the looper elements shown in FIGURES 5a through e is made more clear in FIGURES 8 through 11. FIGURE 8 illustrates forward sewing motion, with the control elements 70 and 73 in the position of FIGURES 6a through c. As the control elements 70 and 73 are withdrawn from the path of looper motion, the looper operates in a somewhat conventional fashion with the loop of thread being engaged by the forward end of the looper and pulled backwardly against the looper hook g by the combined forward movement of the goods and elliptical movement of the looper. From the position of FIGURE 8, the needle enters into the loop carried by the looper as it moves in the direction of motion of the goods. The loop is slipped from the looper head 17a by this motion, and a stitch is formed as the needle 11 enters the goods. As the needle 11 is withdrawn from the goods, the looper head 17a, moving in a clockwise direction viewed from above, has passed around one end of the elliptical path and is again moving forward. The spreader jaws 17b and 17c enter into the small loop of thread thrown by the needle, to open that loop and cause the looper head 17a to enter into the loop as it moves against the direction of goods feeding. The loop of thread thus captured is drawn against the looper hook g by the combined motion of the looper head 17a and the goods feeding. The loop is retained against the looper hook g as the looper head moves along its path around the other end of the elliptical path. As the looper head 17a again reaches the position indicated in FIGURE 8, the needle descends along its curved path to again enter the loop and the cycle is repeated.

Figure 9:
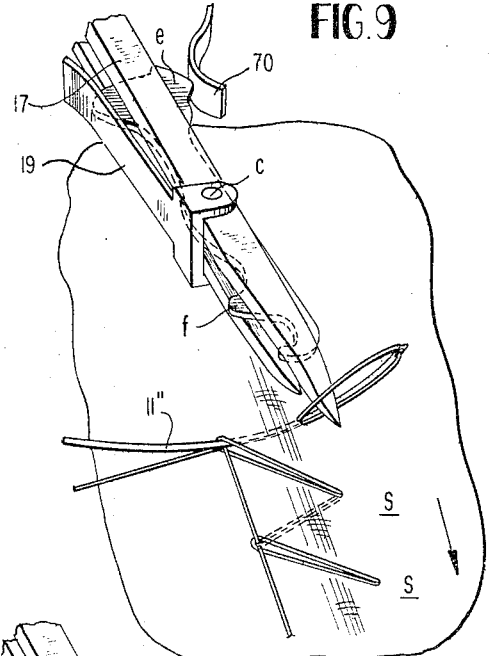
FIGURE 9 is a perspective view of the looper during backward sewing motion, showing the looper engaging the thread as the needle is withdrawn from the goods to begin forming a loop.
Figure 10:
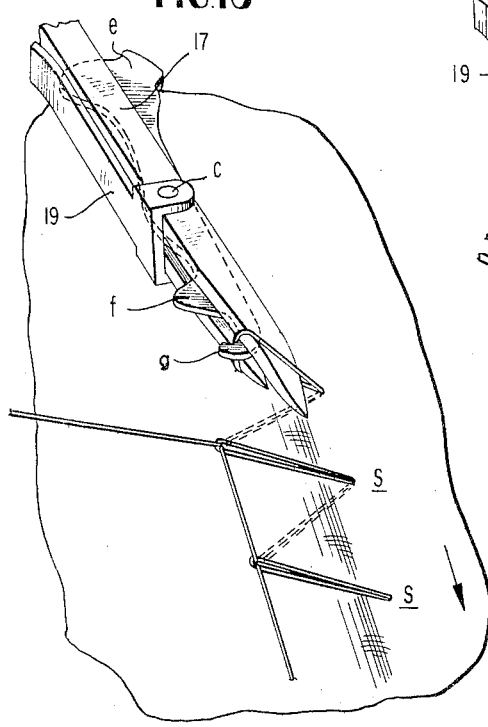
FIGURE 10 is a perspective view of the looper during backward sewing motion, showing the loop latched and retained on the looper to form the loop.
Figure 11:
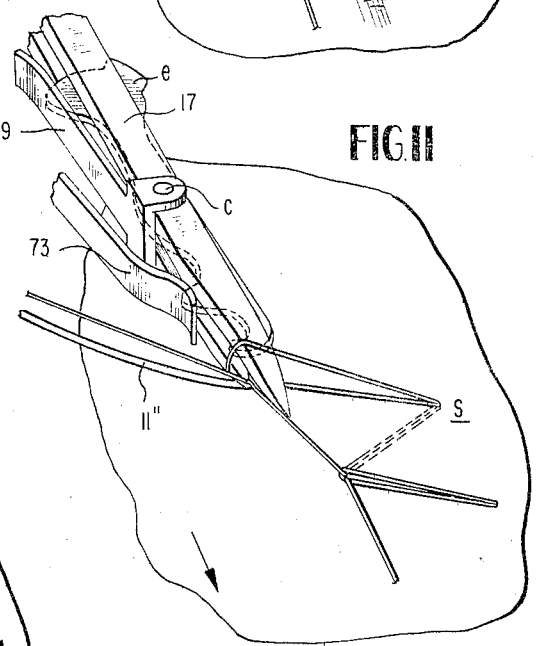
FIGURE 11 is a perspective view of the looper during backward sewing motion, showing the release of the loop as the needle enters the loop to form a stitch.

FIGURES 9 through 11 illustrate the cooperation of the looper and the control elements 70 and 73 when the control elements are held in the position for backward sewing as shown in FIGURES 7a through c. When the control elements 70 and 73 are held in that position, the slightly displaced elliptical path of the looper carries it adjacent the positions of the control elements, so as to cause the control cams of the rocking plate 18 to engage the fixed position control elements 70 and 73 at certain positions along the path of movement of the looper. As shown in FIGURE 9, control element 70 engages the cam e as the looper moves along its elliptical path to open and enter a loop of the thread as the needle withdraws from the goods. The engagement of the cam e with the rigid piece 70 causes the rocking plate 18 to pivot about the shaft c, and withdraw the looper hook g within the looper. This permits the looper head to enter into the opened loop of the thread until the thread engages the projection f and can slide no further. At this point, the looper has passed beyond the rigid piece 70 and the cam e no longer is depressed by the rigid piece 70. Under the action of the spring 19, the rocking plate 18 is pivoted about the shaft c to cause the looper hook g to again extend outwardly of the looper. The thread loop is thus controllably retained on the looper between the projections f and g, as shown in FIGURE 10, and may not be pulled from the looper by the combined backward sewing motion of the goods and elliptical motion of the looper. As the looper continues to follow its elliptical path, now opposed to the direction of movement of the goods, the end 73 of the angular lever 71 engages the cam f of the rocking plate 18, as shown in FIGURE 11. As this occurs, the rocking plate 18 is again pivoted about the shaft c to draw the looper hook g within the looper body. The loop is thus controllably released for the formation of a stitch, as the needle 11" enters the loop and the goods.

During both forward and backward sewing motions, the direction of rotation of main shaft 4 is unchanged. Thus, the clockwise direction of movement of the looper head 17a over its elliptical path, when viewed from above, is not greatly varied. However, the cam 15', controlled by the lever 28 as described above, provides a slight displacement of the elliptical path without changing the size of the described ellipse. This slight displacement has been found necessary in order to provide correct timing for engagement of the control elements 70 and 73 with the projections of the rocking plate 18 and to slightly displace the loop for proper engagement with the needle 11" while sewing in either direction, in accommodation to the varying motion of the goods being sewn.

According to the invention, operation of the machine can be divided into four separate operations: general operation, feeding of goods, stitch length regulation and change of the sewing direction.

General operation

By means of wheel 2 and main shaft 4, gears 5 and 12 impart a rotating movement to their corresponding mechanisms. Gear 5 engages gear 6, which actuates shaft 7 and its eccentric 7a, which, by means of linkage 8 connected thereto, imparts a movement to oscillating lever 9, which, through shaft 10, actuates the needle holding means 11 which forms a rocking arm having at its end grip 11′ for needle 11″.

The movement of the looper arm is combined with that of the needle (FIGURES 1 and 4). Gear 12 engages gear 13 which rotates shaft 14 with its eccentric 14b, which transmits its movement to the looper arm through support bearing 16 hinged to the looper arm 17 by means of a hinge pin 16b passing through ears 16a. The looper is guided by a sleeve 20 having a spring 22 and a connecting rod 21 hinged to the sleeve 20 at one end and connected, at the other end, with the end of a lever 23 fixed to a shaft 24, to which another lever 25 is fixed at the opposite side, said lever 25 being actuated by a cam 26 which thus causes the rocking of both levers 23 and 25.

The needle is given an oscillating movement following an arch, and the looper head 17a, due to the action of guiding sleeve 20 and its spring 22 in cooperation with eccentric 14a, travels along a path substantially in the form of an ellipse, said ellipse having one of its vertexes in its most backward point (point of departure) and having the points at the end of its longer axis at a higher level than the points at the end of its shorter axis. The arch described by the needle crosses the ellipse along the shorter axis of the latter, that is, through its lower portion. The looper, therefore, cooperates with the needle as follows: The looper head goes from its point of departure down to a point just above the needle, where the looper head picks up the thread just when the needle starts its return path below the looper head, the thread surrounding the looper head and being guided by the step in the upper stationary jaw and by the groove on the lower surface of the lower stationary jaw and retained by the looper hook g. (During the forward sewing operation, the rocking plate 18 does not move.) The looper head follows along its elliptic path and goes up until reaching the point opposite the point of departure where it has reached about the same level as the latter; and then the looper head goes back and down until it crosses the needle path. The needle, which had gone back to its point of departure, moves forward again and goes through the looper head between the lower stationary jaw and the rocking plate, where it again takes the thread from the looper to make the loop. The unthreaded looper head then moves back upwardly to the point of departure, and the cycle is repeated.

Feeding of the cloth

The cloth is placed on the housing T of the cloth feeding means. The eccentric 39 (FIGURE 3), fastened to the main shaft 4 and placed between the two sides of a mouth 41a provided in the follower 41, moves the follower 41 about pivot 40a in an oscillating movement, during which studs 44a of ratchet 44 slide along elongated window 41′ and groove 43a.

Pawl arms 44c and 44d alternatively actuate ratchets 45 or 46 having oppositely inclined teeth depending on whether the cloth advances or goes back. Ratchets 45 and 46 are fastened to a transmission shaft 47, which, through intermeshing gear wheels 49, 50, 51 imparts a rotating movement to the toothed discs 52, 53 which directly engage the cloth.

Stitch distance regulation

The distance between stitches can be regulated by regulating the oscillating movement of the lever 44, and pawl arms 44c, 44d, which move the feeding means of the machine. This regulation is made by means of the elongated slot 41′ and the stud 44a sliding along, in cooperation with a block 43 connected to the opposite stud 44a of the lever 44 which slides along the groove 43a of the block 43. The block 43 is pierced by a threaded shaft 42 having at one end an operating wheel P, said wheel permitting the modification at will of the position of the block and, consequently, the degree of movement of the ratchet means, that is, the rate of advance of the cloth.

Change in the sewing direction

In order to change the sewing direction of the machine, it is necessary to put in operating engagement the pawl arm which has been out of engagement. This is obtained (FIGURES 1, 2 and 3) by means of an oscillating lever 31 moving about shaft 32 and with one end 31b engaging the upper end of a vertical lever 38, which, engaging by means of its lower fork, stops M and M′ of the ratchet arms 44c and 44d, makes said arms engage in turn either pinion 45 (backward movement) or pinion 46 (forward movement).

Operation of lever 31 is effected by means of shank 33 having a side recess 33′ and a spring 34 transverse to the body of the machine. A parallel shank 35 is also provided. Shanks 33 and 35 are provided with buttons A and R respectively (FIGURE 1).

Between shanks 33 and 35 is placed angular bell crank 36 which has a fork 36a guiding it in engagement with a projection 35a in shank 35 and has a hook end 36b adapted to engage the recess 33′ of shank 33.

When button A is pressed, the hook end 36b engages the recess 33′ and the machine sews forward. When button R is pressed, the tooth 36b swings back and the machine sews backwards.

During the backward movement, in order to allow the needle to take the thread from the looper, the looper must take a position slightly to the rear. The needle can thus take the thread from the forward part and make the loop. During backward sewing, the looper continues to move in a clockwise direction, while the feeding wheels 52, 53 are rotated to move the cloth toward the operator.

To achieve the necessary slight displacement of the looper path, the other end 31a of the lever 31 abutting with angular lever 28, presses the angular lever 28, fastened to shaft 15″ of cam 15′, thus causing the cam to turn. Cam 15′ causes a slight displacement of sleeve 15 and shaft 14 with its eccentric 14a, said displacement causing a slight backward displacement of the looper path. At the same time, the stay 29 moves the lever 30 and the rigid piece 70, which presses on cam e of the rocking plate 18 and forces the looper hook g to retract to let the thread pass and retain it afterwards when projecting again. During the elliptic movement of the looper, on its return, the cam f knocks the end 73 of the angular lever 71 and that projection is caused to withdraw into the looper, together with looper hook g, which causes the thread to be released.

In the working of the looper, the thread is placed before or behind the looper hook g depending upon whether the sewing movement is forward or backward.

The stitch depth is regulated by means of a lifting bridge 62 (FIGURES 2 and 4) placed between the two toothed discs 52 and 53 of the feeding means and hinged at its ends to an angular lever 63 pivoted at its vertex on a lever 57 fastened to the shaft 56, which in turn is fastened to rocking piece 60, actuated by threaded portion 59 and by spring 61. By threading or unthreading threaded portion 59 (FIGURE 4c), the position of the lifting bridge 62 is regulated at will.

By pressing with the hand or the elbow against lever 55, the bridge 62 is lowered and, with it, the housing T, since said lever is connected to the shaft 56.

The forward end of the plate 68 (FIGURE 4b) is designed to retain the cloth from above and is provided with windows 64a, 64b, a double fork spring 65 which leaves the window space free, a recessed central zone along which travels the needle 11″ and lower hollow parts which provide a seat for the plate 68 on the feeding means 52, 62, 53. A piece 64, which can be adjusted by loosening screw 67, has a lower flange 64c having also a recess for the travel of needle 11″.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A blind stitch sewing machine for forming stitches during forward and backward feeding of goods comprising:
   a looper arm having a looper head,
   means for moving the looper head along a substantially elliptic path,
   a looper hook on the looper head for retaining a thread loop,
   a curved needle carrying a thread,
   means for moving the needle along a curved path transverse of the elliptic path,
   the looper arm, looper hook and needle cooperating to form a single thread chain stitch,
   means for changing the feed direction of goods from forward to backward without changing the direction of movement of the looper head and needle, and
   means controlled by said last named means for causing the looper hook to controllably retain and release a thread loop during backward feeding of goods.

2. A blind stitch sewing machine as in claim 1 further comprising:
   the looper head having two spreader jaws,
   a central pin through the spreader jaws,
   a rocking plate pivotally mounted on the central pin between the spreader jaws,
   extensions projecting laterally from the rocking plate, one of the extensions being the looper hook, other of the extensions being control cams,
   a spring engaging the rocking plate and biasing it to normally cause the extensions to project beyond the looper head.

3. A blind stitch sewing machine as in claim 2 in which:
   said means for causing the looper hook to controllably retain and release a thread comprises control elements positioned by the means for changing feed direction to engage the control cams of the rocking plate during backward feeding of goods,
   the control elements causing the looper hook to be withdrawn within the looper head over portions of the elliptical path.

References Cited by the Examiner
UNITED STATES PATENTS

| | | | |
|---|---|---|---|
| 826,497 | 7/1906 | Fefel | 112—214 |
| 1,132,963 | 3/1915 | Oanderdonk | 112—177 |
| 1,133,572 | 3/1915 | Noble | 112—178 |
| 1,278,204 | 9/1918 | Pierce | 112—177 |
| 1,351,866 | 9/1920 | Noble | 112—178 |
| 2,525,578 | 10/1950 | Austlid | 112—214 |
| 2,601,054 | 6/1952 | Parry | 112—176 |
| 2,719,499 | 10/1955 | Petskeyes | 112—210 |
| 2,894,470 | 7/1959 | Buono | 112—178 |

FRANK J. COHEN, *Primary Examiner.*

ROBERT V. SLOAN, *Examiner.*